United States Patent
Teves et al.

(10) Patent No.: US 12,196,289 B2
(45) Date of Patent: Jan. 14, 2025

(54) HIGH-PERFORMANCE TOOTHED BELT MADE OF EPDM

(71) Applicant: ContiTech Antriebssysteme GmbH, Hannover (DE)

(72) Inventors: Reinhard Teves, Seelze (DE); Heiko Sattler, Wedemark (DE); Jan Michalk, Ballenstedt (DE); Antonius Dikmans, Seelze (DE); Henning Kanzow, Wedemark (DE); Stephanie Kautz, Hannover (DE)

(73) Assignee: ContiTech Deutschland GmbH, Hannover (DE)

( * ) Notice: Subject to any disclaimer, the term of this patent is extended or adjusted under 35 U.S.C. 154(b) by 0 days.

(21) Appl. No.: 18/257,934

(22) PCT Filed: Nov. 25, 2021

(86) PCT No.: PCT/DE2021/200203
§ 371 (c)(1),
(2) Date: Jun. 16, 2023

(87) PCT Pub. No.: WO2022/128009
PCT Pub. Date: Jun. 23, 2022

(65) Prior Publication Data
US 2024/0052910 A1    Feb. 15, 2024

(30) Foreign Application Priority Data
Dec. 18, 2020   (DE) ............. 10 2020 216 256.5

(51) Int. Cl.
*F16G 1/28*   (2006.01)
*B29D 29/08*  (2006.01)
(Continued)

(52) U.S. Cl.
CPC ............. *F16G 1/28* (2013.01); *C08J 7/042* (2013.01); *C08K 3/04* (2013.01); *F16G 1/10* (2013.01);
(Continued)

(58) Field of Classification Search
CPC ................... F16G 1/10; B29D 29/08
See application file for complete search history.

(56) References Cited

U.S. PATENT DOCUMENTS

2006/0148603 A1   7/2006  Burrowes et al.
2011/0003659 A1*  1/2011  Wu ................ D03D 15/283
                                          474/268
(Continued)

FOREIGN PATENT DOCUMENTS

DE   102008055530 A1   6/2010
DE   102016206029 A1  10/2017
(Continued)

OTHER PUBLICATIONS

International search report dated Apr. 4, 2022 of International application PCT/DE2021/200203 claiming property to this application.

*Primary Examiner* — Michael R Mansen
*Assistant Examiner* — Mark K Buse

(57) ABSTRACT

The present invention relates to elastomer toothed belts comprising a fabric spanning the teeth of the toothed belt, wherein the elastomer mixture forming the teeth contains a crosslinked ethylene-propylene rubber (EPM) and/or a crosslinked ethylene-propylene terpolymer rubber (EPDM) accounting for at least 70% by weight of the elastomer mixture based on the polymer proportion and wherein an interlayer is arranged between the fabric and the elastomer mixture forming the teeth which contains at least 70% by weight of hydrogenated acrylonitrile-butadiene rubber (HNBR) based on the polymer proportion of the interlayer.

(Continued)

Such elastomer toothed belts are halogen-free and feature improved durability and good low-temperature stability properties. The present invention further relates to processes for producing such elastomer toothed belts and to the use of a layer of hydrogenated acrylonitrile-butadiene rubber (HNBR) in such toothed belts to increase service life, to improve low-temperature stability and to improve the adhesion between the teeth and the fabric.

20 Claims, 1 Drawing Sheet

(51) Int. Cl.
    *C08J 7/04*         (2020.01)
    *C08K 3/04*         (2006.01)
    *F16G 1/10*         (2006.01)
    *B29K 9/00*         (2006.01)
    *B29K 23/00*        (2006.01)
    *B29K 277/00*      (2006.01)
    *B29K 309/08*      (2006.01)

(52) U.S. Cl.
CPC .......... *B29D 29/08* (2013.01); *B29K 2009/00* (2013.01); *B29K 2023/16* (2013.01); *B29K 2277/00* (2013.01); *B29K 2309/08* (2013.01); *B29K 2995/007* (2013.01); *B29K 2995/0077* (2013.01); *C08J 2309/02* (2013.01); *C08J 2377/00* (2013.01)

(56) References Cited

U.S. PATENT DOCUMENTS

| | | | |
|---|---|---|---|
| 2014/0080647 A1* | 3/2014 | Sakamoto | F16G 1/28 474/205 |
| 2015/0152590 A1* | 6/2015 | Knox | C08K 9/04 524/556 |
| 2017/0082174 A1* | 3/2017 | Parziale | F16H 57/0489 |
| 2017/0299017 A1* | 10/2017 | Gregg | F16G 1/04 |
| 2018/0051772 A1* | 2/2018 | Gregg | B29C 45/1642 |
| 2018/0313431 A1* | 11/2018 | McNamee | F16G 1/28 |
| 2019/0011016 A1* | 1/2019 | Yoshida | C08L 23/08 |
| 2019/0162269 A1 | 5/2019 | Kucharczyk et al. | |
| 2019/0178339 A1* | 6/2019 | Gao | F16G 1/28 |
| 2021/0040682 A1* | 2/2021 | Shimokawa | F16G 1/28 |
| 2023/0076730 A1* | 3/2023 | Petherbridge | B32B 5/024 |

FOREIGN PATENT DOCUMENTS

| | | |
|---|---|---|
| DE | 102019205005 A1 | 10/2020 |
| EP | 1677030 B1 | 7/2013 |

* cited by examiner

HIGH-PERFORMANCE TOOTHED BELT MADE OF EPDM

The present invention relates to elastomer toothed belts comprising a fabric spanning the teeth of the toothed belt, wherein an elastomer mixture forming the teeth contains a crosslinked ethylene-propylene rubber (EPM) and/or a crosslinked ethylene-propylene terpolymer rubber (EPDM) accounting for at least 70% by weight of the elastomer mixture based on the polymer proportion and wherein an interlayer is arranged between the fabric and the elastomer mixture forming the teeth which contains at least 70% by weight of hydrogenated acrylonitrile-butadiene rubber (HNBR) based on the polymer proportion of the interlayer. The present invention further relates to processes for producing such elastomer toothed belts and to the use of a layer of hydrogenated acrylonitrile-butadiene rubber (HNBR) in such toothed belts to increase service life, to improve low-temperature stability and to improve the adhesion between the teeth and the fabric.

PRIOR ART

Toothed belts are conventionally fabricated from elastomer mixtures based on chloroprene ($CH_2$=C(Cl)—CH=$CH_2$). Higher-quality toothed belts containing sulfur-crosslinked HNBR (=hydrogenated acrylonitrile/butadiene rubber) as base polymer are available as an alternative. In addition, the use of peroxidically crosslinked HNBR is known for particularly good heat aging resistance. The strength of the HNBR elastomers can be further improved by adding zinc salts of acids with free-radically polymerizable groups, such as in particular acrylic or methacrylic acid, but also sorbic acid, for the peroxidic crosslinking.

For reinforcement, conventional toothed belts contain a layer of fabric on the toothed side and usually also on the side opposite the toothed side, which covers the teeth or the band of the belt and through which a toothed pulley engages between the teeth of the belt. To firmly attach such a fabric to the teeth of the toothed belt the fabric is generally initially coated with a mixture of resorcinol/formaldehyde and a latex (also referred to as an RFL layer). Subsequently applied as an adhesion-promoting mixture is an elastomer mixture which is generally formed from the same elastomer as the teeth of the toothed belt to ensure good joining of the coated fabric with the elastomer of the teeth. In the case of teeth of the toothed belt formed from chloroprene a chloroprene coating is applied to the fabric and in the case of teeth of the toothed belt formed from HNBR a coating of HNBR is applied to the fabric.

Application of the adhesion-promoting mixture is traditionally effected by dissolving the uncrosslinked elastomer in a suitable organic solvent (for example toluene, xylene or a carboxylic ester) and applying it to the RFL-treated fabric in an amount such that after removal of the solvent an adhesion-promoting layer having a thickness in the range of about 10 μm is formed. It is alternatively possible to apply a thin layer of the elastomer to the RFL-treated fabric by calendaring.

However, the problem with conventional high-performance toothed belts made of chloroprene rubber is the chlorine content thereof since for example combustion of end-of-life chloroprene articles liberates hydrogen chloride, which requires costly and complex filtering out of the combustion offgases. There is therefore a need for an alternative material for chloroprene rubber which imparts ideally comparable performance characteristics but is free from chlorine or other halogens.

HNBR meets the requirement of a lowest possible chlorine content but on the other hand is associated with the disadvantages of a relatively high price and a relatively low flexibility in the range of lower temperatures.

Elastomer materials that could better meet the requirement of comparable performance characteristics include ethylene-propylene elastomers such as for example ethylene-propylene-diene elastomers (EPDM). For example, DE 10 2008 055 530 describes toothed belts for camshaft drives in internal combustion engines in which the elastomer of the toothed belt body consists of an EPDM mixture also containing special short fibers having a length in the range from 2 to 5 mm. The mixtures described in DE 10 2008 055 530 are said to allow NBR and HNBR to be at least largely dispensed with while achieving improved low-temperature flexibility and a longer service life coupled with identical or better force transmission.

However, in the case of toothed belts made of EPDM where a layer of EPDM was arranged between the fabric and the EPDM of the toothed belt, it was found that adequate bonding of the fabric to the EPDM material was not achievable, these toothed belts thus exhibiting only inadequate durability. Even direct bonding of a fabric having a conventional RFL coating to the teeth of a toothed belt made of EPDM did not make it possible to achieve an adequate service life of the toothed belt.

EP 1 677 030 B1 describes a toothed belt having a body made of EPDM and a fabric secured thereto where the fabric has been impregnated and coated with a resorcinol-formaldehyde latex comprising a carboxylated hydrogenated nitrile rubber as the latex. The coating is said to achieve an improved adhesion of the fabric to the EPDM body of the toothed belt (compared to a toothed belt without RFL coating). However, such bonding does not show significantly improved durability, which could be a consequence of the markedly different polarities of the resorcinol-formaldehyde resin and the carboxylated hydrogenated nitrile rubber on the one hand and the nonpolar EPDM elastomer on the other hand or of the relatively large difference in stiffness between the two materials.

Against this backdrop there is a need for processes and means which make it possible to realize a cost-effective and ideally halogen-free toothed belt having a long service life. There is also a need for processes and means which make it possible to realize secure bonding of a fabric to an EPDM elastomer in a toothed belt. The present invention addresses this need.

DETAILED DESCRIPTION

In the context of the investigations upon which the present invention is based it has surprisingly been found that a good service life and bonding of the toothed belt body and the fabric may be realized with a toothed belt as specified in claim 1. Preferred embodiments of such toothed belts are specified in dependent claims 2 to 11.

Accordingly the present invention relates in a first aspect to an elastomer toothed belt which has a body which has a length, sides arranged at a lateral distance to one another and an inside and an outside and a multiplicity of teeth arranged spaced apart from one another in a longitudinal direction on the inside or the outside of the body and a fabric which spans the teeth, wherein the elastomer mixture from which the teeth are formed contains a crosslinked ethylene-propylene rubber (EPM) and/or a crosslinked ethylene-propylene terpolymer rubber (EPDM) which accounts for at least 70% by weight of the elastomer mixture forming the teeth based on the polymer proportion and wherein an interlayer containing at least 70% by weight of hydrogenated acrylonitrile-butadiene rubber (HNBR) based on the polymer proportion of the interlayer is arranged between the fabric and the elastomer forming the teeth.

For improved bonding of the fabric to the toothed belt body it is accordingly decisive that the substantial proportion of the elastomer is made of EPDM/HNBR in the contact region of the toothed belt body and the interlayer. Higher proportions of other elastomers can impair this bonding, and the proportion thereof should thus generally be kept low but need not necessarily have a disruptive effect.

Unless otherwise stated hereinbelow all reported quantities relate to the polymer proportion in the respective composition, with the result that the sum total of these reported quantities can also exceed 100%.

In the context of the invention described here EPM or EPDM forms the main elastomer material at least of the teeth of the toothed belt, wherein it is especially preferable when the teeth contain the crosslinked ethylene-propylene rubber (EPM) and/or the crosslinked ethylene-propylene terpolymer rubber (EPDM) in a proportion of at least 80% by weight, preferably at least 90% by weight, very particularly preferably at least 95% by weight and yet more preferably at least 98% by weight based on the polymer proportion of the elastomer mixture forming the teeth. Alternatively or in addition it is preferable when these elastomers form the predominant elastomer material of the overall contact surface between the fabric and the toothed belt (i.e. teeth and connecting webs). It is furthermore preferable when the entire body of the toothed belt is predominantly (i.e. to an extent of at least 70% by weight) formed from EPM and/or EPDM as the elastomer since this simplifies production of the toothed belt body. "Entire body" is presently to be understood as meaning the toothed belt body without any reinforcing elements, for example tensile strands, that may be present.

In one alternative 100% of the elastomer in the elastomer mixture may be provided by EPM or EPDM. In a further alternative the proportion accounting for the balance to 100% of the elastomer may be formed by a different elastomer, wherein the different elastomer may preferably be formed by one or more of silicone rubber, polychloroprene, epichlorohydrin, hydrogenated nitrile-butadiene rubber, natural rubber, ethylene-vinyl acetate copolymer, ethylene-methacrylate copolymers and terpolymers, styrene-butadiene rubber, nitrile rubber, chlorinated polyethylene, chlorosulfonated polyethylene, alkylated polyethylene-polysulfone, butadiene rubber and mixtures thereof. However, it is preferable when the other elastomer is not a halogen-containing elastomer.

In one embodiment the proportion accounting for the balance to 100% of the elastomer, or at least a portion thereof, may be NBR or HNBR. In yet a further alternative a mixture of EPM and EPDM may be used as the main component of the elastomer of the teeth of the toothed belt, i.e. at least 70% by weight of the elastomer in the teeth is provided by EPM and EPDM, wherein it may be preferable when the teeth of the toothed belt are formed exclusively from a mixture of EPM and EPDM as the elastomer.

The EPDM used in the teeth of the toothed belt of the present invention is not subject to any relevant restrictions and any suitable conjugated diene may be used for production thereof, including for example 1,4-hexadiene, dicyclopentadiene or ethylidene norbornene (ENB). The EPM or EPDM elastomer preferred in the present invention contains 35% to 80% by weight of ethylene units, 65% to 25% by weight of propylene units and 0% to 10% by weight of the unsaturated diene component. In a more preferred embodiment the EPM or EPDM elastomer contains 55% to 78% by weight of ethylene units and in a most preferred embodiment the EPM or EPDM elastomer contains 65% to 75% by weight of ethylene units. At these more preferred ethylene contents endless belts which contain the EPM or EPDM elastomer compositions as body sections of the toothed belt show an improved pilling resistance. It is most preferable when the elastomer of the entire body of the toothed belt according to the invention is EPDM.

The teeth of the toothed belt, and optionally the entire body with the exception of reinforcing elements such as reinforcing bands integrated therein, are preferably formed from an elastomer mixture containing not only the elastomer but also a reinforcing filler especially in an amount of 25 to 250 parts and preferably 25 to 100 parts per 100 parts of elastomer and optionally 1 to 30 parts of a metal salt of an $\alpha,\beta$-unsaturated organic acid per 100 parts of elastomer.

Suitable fillers can include for example carbon black, calcium carbonate, talc, clay, hydrated silica or mixtures of these materials. The fillers on the one hand impart the elastomer material with advantageous thermal stability while on the other hand realizing good tear resistance and dynamic properties.

The elastomer mixture may also contain textile fibers having a length of up to 7 mm as fillers and/or for reinforcement, where said fibers may be formed from aramid, carbon, glass, polyester, polyamide, synthetic silk, polyvinyl alcohol or other materials.

In addition to these ingredients, the elastomer mixture may contain further ingredients typically used in elastomer compositions. Such ingredients include, for example, process and extender oils, antioxidants, waxes, pigments, softeners, plasticizers and the like. These additives may be used in amounts conventionally used in standard elastomer mixtures.

The EPM and/or EPDM in the elastomer forming the teeth of the elastomer toothed belt is crosslinked, wherein the crosslinking may be induced by any crosslinking agent customary in the art. Particularly suitable crosslinking agents are sulfur crosslinkers and peroxide-based crosslinkers. Accordingly, the crosslinked elastomer in the elastomer mixture from which the teeth are formed is preferably a sulfur-crosslinked or peroxidically crosslinked elastomer. This elastomer is very particularly preferably a peroxidically crosslinked elastomer.

Preferred peroxidic crosslinking agents for the EPM and/or EPDM elastomer in the context of the invention described herein are organic peroxides including but not limited to dicumyl peroxide, bis(t-butylperoxy)diisopropylbenzene, t-butyl perbenzoate, di-t-butyl peroxide, 2,5-dimethyl-2,5-di-t-butylperoxyhexane and $\alpha,\alpha$-bis(t-butylperoxy)diisopropylbenzene. A very particularly preferred organic peroxide is $\alpha,\alpha$-bis(t-butylperoxy)diisopropylbenzene.

Curing-active amounts of organic peroxide for the purposes of the present invention are typically 2 to 10 parts (per 100 parts of elastomer). Preferred contents of organic peroxide are between 4 and 6 parts per 100 parts of elastomer. As part of a mixed curing system sulfur may optionally be added to the organic peroxide crosslinking composition in an amount of 0.01 to 1.0 parts (per 100 parts of elastomer) to improve the elastic modulus of the cured elastomer without adversely affecting the tear resistance thereof.

The second essential constituent of the toothed belt according to the invention is an interlayer which contains HNBR as its predominant polymer component (i.e. 70% by weight or more). This layer is not a layer formed from resorcinol-formaldehyde and HNBR since such layers cannot impart sufficiently advantageous adhesion to the teeth of the toothed belt formed from EPM/EPDM as the elastomer due to the high polar proportion of resorcinol-formaldehyde. It is accordingly preferable when the interlayer contains no proportions of resorcinol-formaldehyde resin included therein. In the context of the present application the term "HNBR" or "hydrogenated acrylonitrile-butadiene rubber" is to be understood as meaning hydrogenated rubber materials composed of acrylonitrile and butadiene but also corresponding terpolymers which additionally contain up to 20% by weight of acrylic and/or methacrylic ester.

In addition to the HNBR the interlayer may also contain (in a total proportion of not more than 30% by weight based on the total polymer amount) the elastomers cited above as a possible addition to the EPM and/or EPDM of the tooth material of the toothed belt according to the invention. However, preference is given to a highest possible proportion of HNBR, wherein at least 80% by weight may be considered preferable and at least 90% by weight may be considered particularly preferable, in each case based on the polymer proportion in the interlayer.

Particularly advantageous HNBR for use as the interlayer material in the toothed belts according to the invention are hydrogenated acrylonitrile-butadiene rubbers having a degree of hydrogenation in the range from 70% to 99%, preferably 95% to 98%. Also particularly suitable alternatively or in addition are hydrogenated acrylonitrile-butadiene rubbers having an acrylonitrile content of 18% to 47% by mass and in particular 30% to 37% by mass.

In the elastomer toothed belt according to the invention the interlayer is advantageously crosslinked, wherein employable crosslinking agents in particular include sulfur or peroxidic crosslinkers, in particular organic peroxidic crosslinkers, as cited hereinabove for the crosslinking of the EPM and/or EPDM elastomers. In the interlayer, sulfur-crosslinked HNBR exhibited better adhesion values while peroxidically crosslinked HNBR exhibited better long-term heat resistances.

On the one hand, the thickness of the interlayer should be great enough to impart a sufficient adhesion between the fabric and the teeth of the toothed belt but, on the other hand, no additional improvement in adhesion or other properties was observed above a certain thickness and so a further increase in thickness tends to be disadvantageous due to the cost of HNBR. Against this backdrop a thickness of the interlayer of at least about 10 µm may be considered preferable, a thickness in the range from about 10 to 500 µm may be considered particularly preferable and a thickness in the range from about 50 to 200 µm may be considered very particularly preferable. Interlayers having a thickness in the particularly preferred ranges may be applied to the fabric by calendaring, and this coating may therefore be effected solventlessly.

The HNBR interlayer preferably has a Shore A hardness as determined according to DIN ISO 7619-1 of less than 90. It is particularly preferable when the hardness of the HNBR interlayer is in a similar range as the Shore A hardness of the elastomer mixture forming the teeth, i.e. preferably in the range of ±10 and in particular ±5 of the shore A hardness of the elastomer mixture forming the teeth.

In order to impart electrical conductivity and to be able to discharge static charges the interlayer may contain an electrically conductive additive in addition to the HNBR elastomer, wherein carbon black may be considered a particularly suitable electrically conductive additive here. If carbon black is included in the interlayer the proportion thereof is preferably in the range from 20 to 70 parts and particularly preferably 30 to 60 parts based on 100 parts of polymer in the interlayer. Alternatively or in addition the interlayer contains an electrically conductive additive, in particular in the form of carbon black, in an amount which imparts the toothed belt with an electrical resistance determined according to ISO 9563:2015 of less than 50 MΩ and preferably less than 5 MΩ.

To improve strength and/or crosslinking yield the interlayer may further contain metal salts of organic acids with polymerizable groups such as in particular zinc dimethacrylate or zinc diacrylate or carboxylic acids having two or more conjugated double bonds, in particular in the form of sorbic acid.

Having regard to the interlayer and the body of the elastomer toothed belt it must be noted that in the context of a crosslinking the crosslinker and the elastomers are chemically reacted and reactive constituents such as sorbic acid or the cited metal salts are optionally included in these reactions.

The fabric present in the elastomer toothed belts according to the invention may have any desired configuration, for example a conventional fabric composed of warp and weft threads at any angle, or may be composed of warp threads, or of a knitted or braided or warp-knitted configuration and the like. More than one material ply may be used. If desired the material may be cut at an incline so that the strands form an angle with the direction of motion of the belt. Conventional fabrics using materials such as cotton, polyester, polyamide, hemp, jute, glass fiber and various other natural and synthetic fibers may be used. In a preferred embodiment of the invention the fabric layer is composed of an extensible wear-resistant fabric where at least one of the warp or weft threads is made of polyamide. Fabrics composed of at least 70% polyamide, in particular composed of a linear aliphatic polyamide, are particularly preferred. In the most preferred form the fabric is composed of nylon 66.

To impart improved adhesion on the interlayer the fabric may comprise a coating with a resorcinol-formaldehyde latex (RFL). Employable RFL compositions include any suitable material, wherein advantageously the proportion of the resorcinol-formaldehyde resin in the RFL composition is in the range from 2% to 40% by weight and the proportion of the latex is in the range from 60% to 98% by weight in each case based on the solids content of the composition. Proportions in the range from 5% to 30% by weight for the resorcinol-formaldehyde resin and 70% to 95% by weight for the latex may be considered preferable.

There are no particular requirements in respect of the latex included in the RFL composition, and so any latex conventionally used in RFL compositions may in principle be utilized. Examples of such latex materials include inter alia HNBR, NBR, carboxyl HNBR, carboxyl NBR, vinylpyridine/styrene-butadiene rubber ("VP/SBR"), carboxyl VP/SBR, SBR, chlorosulfonated polyethylene ("CSM"), ethylene-alpha-olefin elastomers such as ethylene-propylene-diene terpolymer ("EPDM") and ethylene-propylene copolymer ("EPM"), wherein mixtures of two or more of these materials may also be used. It is preferable in terms of disposal characteristics for the latex to be halogen-free. A latex preferred for the RFL composition in the context of the present invention is a vinylpyridine-containing latex such as vinylpyridine/styrene-butadiene rubber ("VP/SBR") or carboxyl VP/SBR. The vinylpyridine content of this latex is preferably more than 50% by weight.

A range from 10% to 50% by weight (based on the total weight of the RFL-coated fabric) may be considered appropriate for the application rate of the RFL composition.

To further enhance the structural integrity of the toothed belt said belt may additionally contain a plurality of tensile strands embedded in the toothed belt body. These tensile strands, especially in the form of cords, may be made of polyamide (PA), aramid, polyester, glass (for example E- or K-glass), carbon, polyetheretherketone (PEEK) or polyethylene 2,6-naphthalate (PEN).

While an interlayer based on HNBR between the fabric and the teeth of the toothed belt is essential to the invention for the described elastomer toothed belts, the toothed belt may also comprise on the side opposite the teeth a fabric cover ply which may in turn have a PFL coating and/or be bonded to the toothed belt body via an interlayer based on HBNR or another material.

In a further aspect the present invention relates to a process for producing an elastomer toothed belt comprising the steps of:
(i) providing a fabric;
(ii) applying a coating to the fabric, wherein the coating composition contains at least 70% by weight of hydrogenated acrylonitrile-butadiene rubber (HNBR) based on the polymer proportion in the coating composition,
(iii) securing the fabric to an elastomer toothed belt body whose teeth are formed from an elastomer mixture containing at least 70% by weight, based on the polymer proportion of the elastomer mixture forming the teeth, a crosslinked ethylene-propylene rubber (EPM) and/or a crosslinked ethylene-propylene terpolymer rubber (EPDM) in such a way that the coating from step (ii) is arranged between the teeth and the fabric.

It is preferable when the process produces an elastomer toothed belt as specified above.

The applying of the coating in step (ii) may advantageously be carried out by applying a solution of the HNBR to the fabric and subsequently evaporating the solvent. The solvent employed may be any desired solvent suitable for dissolving HNBR, for example xylene, toluene or carboxylic ester. The applying of the interlayer from a solution has the advantage that relatively thin layers may be applied, thus minimizing the material usage of HNBR.

On the other hand the applying of the interlayer from a solution has the disadvantage that the solvent requires removal during further processing which may be undesirable due to the associated environmental burden. It is thus also possible and preferable to apply a prefabricated interlayer to the fabric by calendaring. The greater thickness of the HNBR layer generally employed in this case has the additional advantage that better stability is achieved in the connecting web area of the toothed belt because the distance between tensile strands present in the toothed belt and the fabric is increased.

It has already been mentioned above that a further improvement in adhesion between the fabric and the interlayer may be realized by applying an RFL layer to the fabric. In the context of the present invention preference is accordingly given to a process which additionally comprises a step of applying an adhesion-promoting layer of resorcinol/formaldehyde/latex prior to step (i). This applying may be realized for example by an immersion treatment where the fabric is immersed in a solution of the RFL composition, withdrawn and subsequently dried for as long as required to obtain the desired RFL application rate.

The securing in step (iii) of the process preferably comprises a step of crosslinking elastomer in the teeth and optionally the toothed belt body and in the interlayer.

The present invention is based on the surprising finding that good bonding of a toothed belt body based on BPM and/or EPDM to a reinforcing fabric may be realized by incorporating an interlayer composed of HNBR. Improved low-temperature stabilities are achievable compared to elastomer toothed belts based on HNBR. A further aspect of the present invention accordingly relates to the use of a layer of hydrogenated acrylonitrile-butadiene rubber (HNBR) arranged between EPM and/or EPDM teeth of a toothed belt and a fabric spanning the teeth for increasing the service life of the toothed belt and/or for improving the adhesion between the teeth and the fabric in a toothed belt and/or improving the low-temperature stability of the toothed belt.

The invention will now be more particularly illustrated with reference to a number of working examples which, however, should not be regarded as restricting the scope of protection of the application in any way.

The invention is further elucidated with reference to the schematic drawings.

Figure 1:
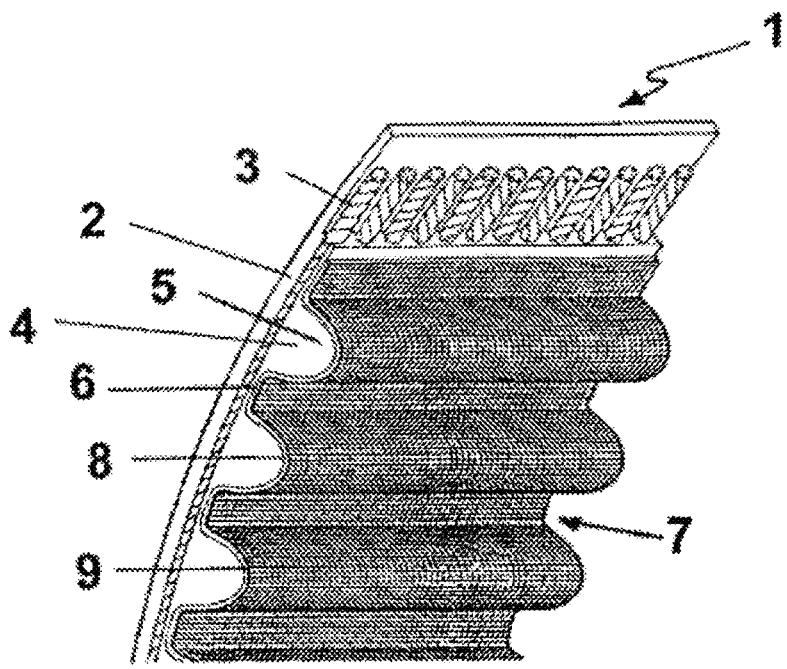
FIG. 1 shows a three-dimensional representation of a toothed belt provided with a coating.

FIG. 1 shows a toothed belt having an outer ply 2 as the belt backing, an embedded strength member 3 and a substructure 4. The strength member consists of a plurality of tensile strands which in a parallel arrangement form a strength member ply shown as a single-ply embodiment in FIG. 1. The tensile strand, especially in the form of cords, may be made of polyamide (PA), aramid, polyester, glass (for example E- or K-glass), carbon, polyetheretherketone (PEEK) or polyethylene 2,6-naphthalate (PEN) or of combinations of the cited materials.

The outer ply (2) and the substructure (4) as a whole form the elastic main body which in the context of the present invention is composed of a vulcanizate based on EPM, EPDM or an EPM/EPDM mixture for example.

The substructure 4 is provided with a tooth-shaped profile comprising teeth 5 and tooth-connecting webs 6 and forms the force-transmission zone 7 which is particularly susceptible to wear. For this reason the force-transmission zone is provided with an abrasion-resistant coating 8 in the form of a textile cover ply. The textile cover ply is made of a woven or knitted fabric which is preferably composed of polyamide (PA) and/or polyester and/or cotton and/or aramid and/or polyetheretherketone (PEEK). A layer composed of HNBR is arranged between the textile cover ply and the elastomer forming the teeth and tooth-connecting webs of the toothed belt. According to the invention an interlayer (9) composed of HNBR is arranged between the textile cover ply and the elastomer forming the teeth and tooth-connecting webs.

Figure 2:
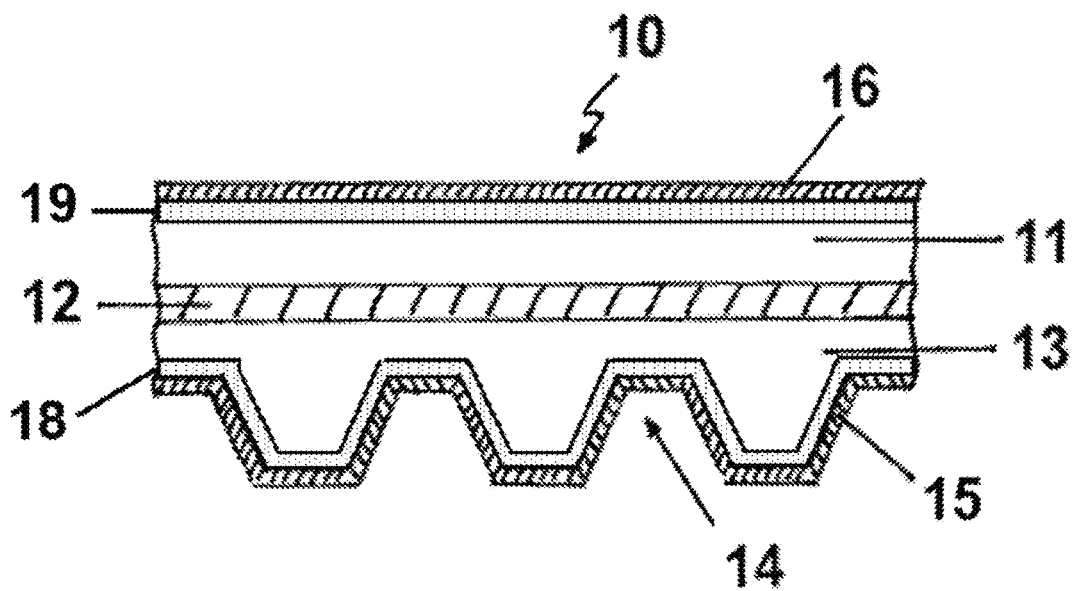
FIG. 2 shows a longitudinal section through a toothed belt having a coating.

The toothed belt according to FIG. 2 comprises an outer ply 11 as the belt backing, an embedded strength member 12 in the form of tensile strands and a substructure 13 having a tooth-shaped force-transmission zone 14. In this working example both the cover ply 11 and the force-transmission zone are provided with a coating 15/16. The two coatings each comprise a textile cover ply, especially in the form of a fabric, which are coated with an elastomer mixture 18 or 19 for bonding of the fabric to the EPDM of the substructure.

The present invention is hereinbelow illustrated with reference to a number of examples which should not in any way be regarded as restricting the scope of protection of the application.

Example

Various toothed belts having the geometry STD 1280 8M-15 were produced with the following construction:

TABLE 1

|  | Comparative 1 | Comparative 2 | Inventive 1 | Comparative 3 |
|---|---|---|---|---|
| Mixture | Chloroprene 40 phr FEF carbon black ZnO crosslinked | EPDM 40 phr FEF carbon black Peroxide crosslinked | EPDM 40 phr FEF carbon black Peroxide crosslinked | EPDM 40 phr FEF carbon black Peroxide crosslinked |
| Reinforcement | Glass cord | Glass cord | Glass cord | Glass cord |
| Fabric coating | Chloroprene* 35 phr FEF carbon black ZnO crosslinked | Chloroprene* 35 phr FEF carbon black ZnO crosslinked | HNBR 32 phr SRF carbon black Sulfur crosslinked | — |
| RFL coating | Vinylpyridine latex basis: RFL content 14% | Vinylpyridine latex basis: RFL content 14% | Vinylpyridine latex basis: RFL content 14% | Vinylpyridine latex basis: RFL content 14% |
| Fabric type | Polyamide | Polyamide | Polyamide | Polyamide |

*Chloroprene rubber; phr = parts per 100 parts of rubber (parts per hundred rubber).

The toothed belts thus produced were subjected to customary tests. The values of properties thus determined are reported in the following table 2:

TABLE 2

|  | Comparative 1 | Comparative 2 | Inventive 1 | Comparative 3 |
|---|---|---|---|---|
| Belt Tests |  |  |  |  |
| Breaking strength on 2 runs [kN/mm/2 run] | 1.3 | 1.23 | 1.28 | 1.24 |
| Breaking elongation [%] | 3.2 | 2.8 | 3.01 | 3.01 |
| EA secant stiffness of one run up to 1% [kN/mm/1 run] | 18 | 20.5 | 20.2 | 18.2 |
| Shore hardness of belt [shore A] | 84 | 84 | 82 | 83 |
| Fabric separation strength [N/mm] | 13.9 | 3.2 | 4.5 | 5.5 |
| Connecting web adhesion [N/mm] | 2.35 | 1.32 | 1.99 | 0.59 |
| Tooth shear strength [N/mm] | 111 | 95 | 100 | 88 |
| Material tests |  |  |  |  |
| ISO 9563 resistance [MΩ] | 0.03 | 3400 | 1.12 | 402.83 |
| Skipping torque [Nm/tooth] | 6.3 | 6.8 | 6.80 | 6.86 |

TABLE 2-continued

|  | Comparative 1 | Comparative 2 | Inventive 1 | Comparative 3 |
|---|---|---|---|---|
| Tensile strand adhesion of individual cords [N] Test bench investigations | 1304 | 1266 | 1248 | 110 |
| 8M service life 5 STD pulleys [h] | 292 | 87 | 352 | 276 |
| Low-temperature stability | − | + | ++ | ++ |
| Absence of chlorine | −− | − | + | + |

It is apparent from table 2 that relative to the comparative toothed belts 1 to 3 the toothed belt "inventive 1" had the best durability (352 h), compared to which the toothed belts made of chloroprene rubber (comparative 1) and EPDM without an interlayer (comparative 3) show a marked decline. The toothed belt made of EPDM having a chloroprene rubber interlayer (comparative 2) shows an inadequate service life of only 87 h.

The toothed belts "inventive 1" and "comparative 3" contained no chlorine. The toothed belts "comparative 1" and "inventive 1" had a relatively low resistance, which allows electrical charges to be discharged via the belt. It is accordingly apparent that the toothed belt "inventive 1" has the best profile of properties.

Compared to a toothed belt made entirely of HNBR as the elastomer material (not shown), the toothed belt "inventive 1" also has a markedly improved low-temperature stability.

The invention claimed is:

1. An elastomer toothed belt comprising:
   a body having a length and sides arranged at a lateral distance to one another also having an inside, an outside and a plurality of teeth spaced apart from one another in a longitudinal direction on the inside and/or the outside;
   a fabric that spans the plurality of teeth; and
   an elastomer mixture that forms the teeth contains a crosslinked ethylene-propylene rubber (EPM) and/or a crosslinked ethylene-propylene terpolymer rubber (EPDM) which accounts for at least 70% by weight of the elastomer mixture based on the polymer proportion and wherein an interlayer containing at least 70% by weight of hydrogenated acrylonitrile-butadiene rubber (HNBR) based on the polymer proportion of the interlayer is arranged between the fabric and the elastomer mixture forming the teeth,
   wherein the interlayer contains an additive that imparts electrical conductivity to the interlayer.

2. The belt of claim 1, wherein the teeth contain the crosslinked ethylene-propylene rubber (EPM) and/or an ethylene-propylene terpolymer rubber (EPDM) in a proportion of at least 80% by weight based on the polymer proportion of the elastomer mixture forming the teeth.

3. The belt of claim 1, wherein the body is formed from crosslinked ethylene-propylene rubber (EPM) and/or ethylene-propylene-terpolymer rubber (EPDM) as the elastomer.

4. The belt of claim 1, wherein the crosslinked elastomer in the elastomer mixture from which the teeth are formed is a sulfur-crosslinked or peroxidically crosslinked elastomer.

5. The belt of claim 1, wherein the interlayer contains at least 80% by weight of hydrogenated acrylonitrile-butadiene rubber (HNBR) based on the polymer proportion of the interlayer.

6. The belt of claim 1, wherein the hydrogenated acrylonitrile-butadiene rubber has a degree of hydrogenation in the range from 70% to 99% and/or an acrylonitrile content of 18% to 47% by mass.

7. The belt of claim 1, wherein the interlayer has a thickness in a range from about 10 to 500 µm and/or a Shore A hardness of less than 90.

8. The belt of claim 1, wherein the additive for imparting electrical conductivity is in the form of carbon black.

9. The belt of claim 8, wherein the interlayer contains a proportion of 20 to 70 parts of the carbon black based on 100 parts of polymer in the interlayer and wherein the elastomer toothed belt has an electrical resistance determined according to ISO 9563:2015 of less than 50 MΩ.

10. The belt of claim 1, wherein the fabric is formed to an extent of more than 70% from polyamide.

11. The belt of claim 1, wherein the fabric has a coating with a resorcinol/formaldehyde/latex, wherein the latex of the resorcinol/formaldehyde/latex has a vinylpyridine content of more than 50% by weight.

12. The belt of claim 1, wherein the elastomer toothed belt has an electrical resistance determined according to ISO 9563:2015 of less than 5 MΩ.

13. The belt of claim 1, wherein the hydrogenated acrylonitrile-butadiene rubber has a degree of hydrogenation in the range from 95% to 99% and an acrylonitrile content of 30% to 47% by mass.

14. The belt of claim 1, wherein the interlayer has a thickness in a range from 50 µm to 200 µm.

15. A method for producing an elastomer toothed belt, the method comprising:
   (i) providing a fabric;
   (ii) applying a coating to the fabric, wherein the coating is formed from a coating composition that contains at least 70% by weight of hydrogenated acrylonitrile-butadiene rubber (HNBR) based on the polymer proportion in the coating composition, and wherein the coating composition contains an additive that imparts electrical conductivity to the coating, and
   (iii) securing the fabric to an elastomer toothed belt body whose teeth are formed from an elastomer mixture containing at least 70% by weight, based on the polymer proportion of the elastomer mixture forming the teeth, a crosslinked ethylene-propylene rubber (EPM) and/or a crosslinked ethylene-propylene terpolymer rubber (EPDM) in such a way that the coating from step (ii) is arranged between the teeth and the fabric,
   wherein the elastomer toothed belt has an electrical resistance determined according to ISO 9563:2015 of less than 5 MΩ.

16. The method of claim 15, wherein the coating in step (ii) is carried out by applying a solution of the hydrogenated acrylonitrile-butadiene rubber to the fabric and subsequently evaporating the solvent or by calendering a film containing the hydrogenated acrylonitrile-butadiene rubber onto the fabric.

17. The method of claim 15, wherein the process additionally comprises a step of applying an adhesion-promoting layer of resorcinol/formaldehyde/latex to the fabric prior to step (i), the resorcinol/formaldehyde/latex having a vinylpyridine content of more than 50% by weight.

18. The method of claim 15, further comprising incorporating a layer of hydrogenated acrylonitrile-butadiene rubber (HNBR) arranged between ethylene-propylene rubber (EPM) and/or ethylene-propylene-terpolymer rubber (EPDM) teeth of the toothed belt and incorporating a fabric spanning the teeth for increasing the service life of the toothed belt and/or for improving the adhesion between the teeth and the fabric in a toothed belt and/or improving the low-temperature stability of the toothed belt.

19. An elastomer toothed belt comprising:
   a body having a length and sides arranged at a lateral distance to one another also having an inside, an outside and a plurality of teeth spaced apart from one another in a longitudinal direction on the inside and/or the outside;
   a fabric that spans the plurality of teeth; and
   an elastomer mixture that forms the teeth contains a crosslinked ethylene-propylene rubber (EPM) and/or a crosslinked ethylene-propylene terpolymer rubber (EPDM) which accounts for at least 70% by weight of the elastomer mixture based on the polymer proportion and wherein an interlayer containing at least 70% by weight of hydrogenated acrylonitrile-butadiene rubber (HNBR) based on the polymer proportion of the interlayer is arranged between the fabric and the elastomer mixture forming the teeth,
   wherein the fabric has a coating with a resorcinol/formaldehyde/latex, wherein the latex of the resorcinol/formaldehyde/latex has a vinylpyridine content of more than 50% by weight.

20. The belt of claim 19, wherein the fabric is formed to an extent of more than 70% from linear aliphatic amide.

* * * * *